US007529794B2

(12) United States Patent
Dorai et al.

(10) Patent No.: US 7,529,794 B2
(45) Date of Patent: May 5, 2009

(54) METHOD AND SYSTEM FOR MEDIATING PUBLISHED MESSAGE STREAMS FOR SELECTIVE DISTRIBUTION

(75) Inventors: Chitra Dorai, Chappaqua, NY (US); Edith Helen Stern, Yorktown Heights, NY (US); Robert Evan Strom, Rigdefield, CT (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 11/358,380

(22) Filed: Feb. 21, 2006

(65) Prior Publication Data

US 2007/0198641 A1    Aug. 23, 2007

(51) Int. Cl.
*G06F 15/16*      (2006.01)
(52) U.S. Cl. ...................................... 709/204; 709/238
(58) Field of Classification Search ................. 709/204, 709/205, 238
See application file for complete search history.

(56) References Cited

U.S. PATENT DOCUMENTS 6,317,776 B1*   11/2001   Broussard et al. ........... 709/204
6,799,298 B2*    9/2004   deVries et al. ............... 715/233
2002/0188731 A1* 12/2002   Potekhin et al. ............. 709/227
2004/0070597 A1*  4/2004   Van Epps ..................... 345/732
2006/0280427 A1* 12/2006   Snowdon et al. .............. 386/46

OTHER PUBLICATIONS

Jin, Yuhui and Strom, Rob. "Relational Subcription Middleware for Internet-Scale Publish-Subscribe." Jun. 8, 2003.*

* cited by examiner

*Primary Examiner*—William C Vaughn, Jr.
*Assistant Examiner*—Scott Christensen
(74) *Attorney, Agent, or Firm*—Yee & Associates, P.C.; Louis J. Percello

(57) ABSTRACT

A computer implemented method for delivering published messages to at least one subscriber in a publish-subscribe messaging system. The method for delivering published messages to a subscriber includes receiving a plurality of message streams and analyzing at least one message from each of the plurality of message streams in accordance with criteria established by the subscriber specifying a message content and a message content quality. At least one message that satisfies the criteria is delivered to the subscriber.

1 Claim, 3 Drawing Sheets

METHOD AND SYSTEM FOR MEDIATING PUBLISHED MESSAGE STREAMS FOR SELECTIVE DISTRIBUTION

BACKGROUND OF THE INVENTION

1. Field of the Invention

The present invention relates generally to the data processing field, and more particularly, to a computer implemented method for routing and delivering messages based on evaluation of quality of information payloads.

2. Description of the Related Art

A publish-subscribe messaging system has two types of clients. Publisher clients generate messages, also referred to as events, containing a topic and some data content. Subscriber clients request a criterion, also called a subscription, specifying the kind of information, based on published messages, the system is to deliver in the future. Publishers and subscribers are anonymous to each other, meaning that publishers do not necessarily know how many subscribers there are or where they are located; and subscribers do not necessarily know where the publishers are located.

A topic-based publish-subscribe messaging system is a system in which subscriptions specify topics of messages which subscriber clients wish to receive. A content-based, publish-subscribe messaging system is a system in which delivered messages are a possibly filtered subset based on the content of published messages; and the subscription criterion is a property that can be tested on each message independent of any other message. For example, a filter may determine whether "topic=stock-ticker/GE" or "Stock/IBM/trade:volume>1000". Content-based or topic-based publish-subscribe systems are referred to herein as "stateless" systems.

There are pre-existing and emerging technologies to solve deficiencies of content-based publish-subscribe systems as they only support limited filtering capability. For example, mediators to process or transform messages may be introduced into the flow of traditional messaging middleware. Although this is a useful concept, in current manifestations, mediators are complex to program and require external database services in order to store and access state. Also, groups of mediators cannot be automatically combined in current implementations.

In addition, with the advent of highly capable, wirelessly connected, widely distributed sensor networks, scenarios are emerging which require intelligent delivery of collected data in a timely fashion. These distributed sensor networks include sensors that capture audio and video, and they can provide a wealth of data, which may overlap in scope (for example, fields of view) and coverage (for example, spatial and temporal), thus varying in quality of data as well as provide potentially new types of messages. While the evolution of the Web has increased information available via user pull, these new scenarios also describe increased information available via push and via rich media streams.

Consider, for example, location information published by various sources including GPS, cell phone triangulation, etc. A subscription to receive messages is needed not only about the location of interest, but also about the quality of the location information, for example, the precision of location data in terms of longitudinal or latitude degrees, or to a finer level of within a few millimeters of the desired location. As an example, an employer may subscribe to information about an employee engaged in repair services, carrying a wireless device including location information. The employer may wish to obtain messages containing such location, selected for their precision. A location message based on GPS can provide the location of an office building which the employee has entered, and a wifi triangulation service might provide a location of which office the employee had entered.

Another example is temperature information published by various sources including weather bureaus, car thermometers, sensors on a manufacturing floor, etc. Often, a subscription to trigger an alarm, for example, needs to specify not only the temperature of interest, but also the quality of the temperature granularity. If a person monitors weather information, a precision within a few degrees may be tolerable. On the other hand, a temperature sensor mounted on a manufacturing floor needs to provide information to a finer level of granularity, for example, to the tenth of a degree. An individual interested in how to dress for the day may subscribe to temperatures precise to a 5 degree range. The same individual may require temperature precise to a fraction of a degree in order to determine if gardens are in danger of freezing.

In addition, when messages carry multimedia payloads, different kinds of quality requirements become paramount. Consider, for example, a problem encountered by a battlefield commander. The commander must keep aware of events transpiring on the battlefield. Low resolution satellite image feeds, higher resolution tank image feeds, and other multimedia information of relevance is being captured, but the commander bears the burden of sorting all the images after they are received in order to obtain the most informative image or images. It would be advantageous to provide a mechanism that enables the commander to set up desired criteria for these multimedia messages ahead of time in such a way that he or she can choose to preferentially receive the most desired image(s).

Current publish-subscribe messaging systems do not provide such a capability. As indicated previously, they may contain some filtering capabilities as well as mediations that perform message transformation of single or multiple messages. Generally, however, these mediations examine individual messages and perform their task in relation to those individual messages. There are some mediations or message transformations which examine multiple messages in order to perform their task. An example is a mediation that provides an "average" computation. These mediations, however, only operate on simple text or numeric message attributes to provide a derived state to the subscriber.

Continuing the battlefield scenario described above, there may be other subscribers, in addition to the battlefield commander, with different criteria. For example, a tank commander may want to receive images of a long view ahead of the tank in order to avoid ambush. This subscription must be satisfied from the same sensor data as that of the battlefield commander; however, for this user, the criteria will be different (for example, depth-of-view, movement identified or the like).

For the most part, current technology acts on individual messages rather than on a stream of messages. However, aggregation of message data is known. For example, SMILE technology (see "Relational Subscription Middleware for Internet-Scale Publish-Subscribe", Yuhui Jin and Rob Strom, $2^{nd}$ International Workshop on Distributed Event-Based Systems (DEBS'03), 2003) can aggregate information from multiple streams, and deliver a message based on this aggregation. SMILE technology, for example, is capable of taking streams representing sales of seats on multiple airline flights, and delivering a current number of available seats on the k cheapest flights to London to a subscriber. No current technology, however, uses samples from a multimedia stream in order to determine whether to deliver multiple messages from the stream, nor do current mediations compare messages from different streams in order to determine which of them should be delivered.

There is, accordingly, a need for a mechanism that can analyze message streams to determine which streams, or parts of streams, should be delivered to one or more users to provide a higher quality of information as specified by the one or more users.

SUMMARY OF THE INVENTION

The present invention provides a computer implemented method for delivering published messages to at least one subscriber in a publish-subscribe messaging system. A computer implemented method for delivering published messages to a subscriber includes receiving a plurality of message streams, and analyzing at least one message from each of the plurality of message streams in accordance with criteria established by the subscriber specifying a message content and a message content quality. At least one message that satisfies the criteria is delivered to the subscriber.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
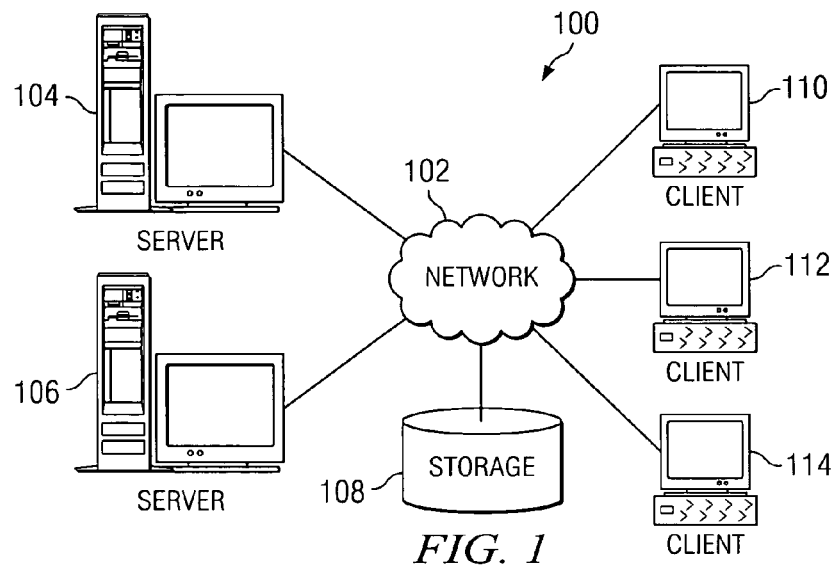
FIG. 1 depicts a pictorial representation of a network of data processing systems in which aspects of the present invention may be implemented.
Figure 2:
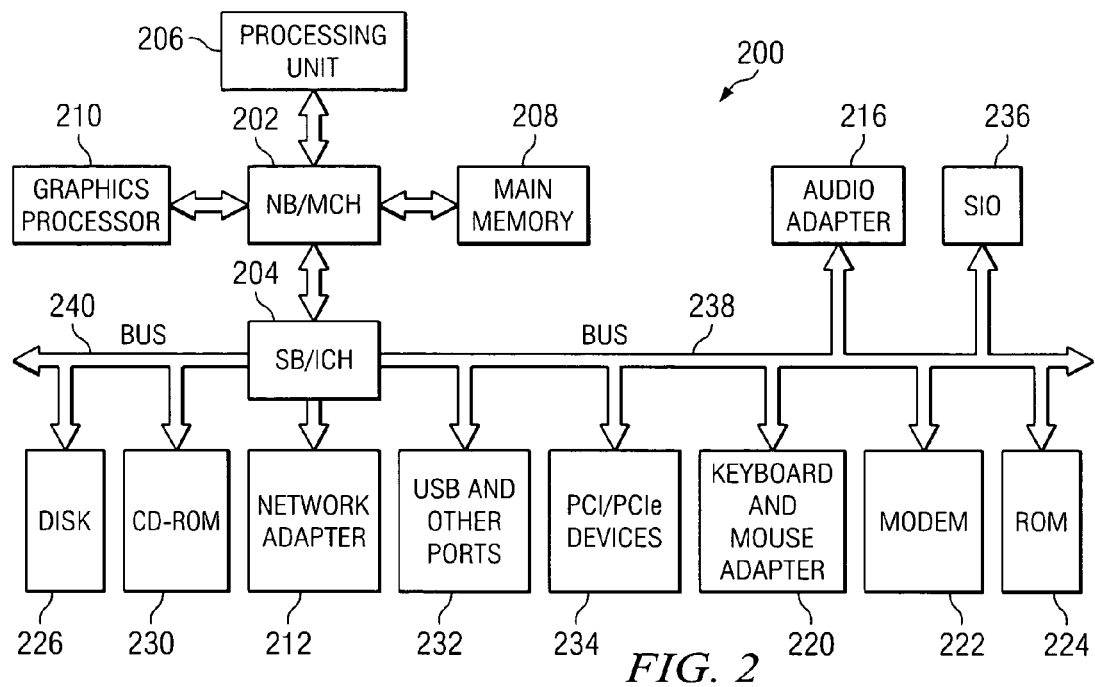
FIG. 2 depicts a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is depicted in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method, system and computer program product for mediating published message streams in a distributed messaging system. A data processing device of the distributed messaging system may be implemented as a stand-alone computing device, or as a distributed data processing system in which multiple computing devices are utilized to perform various aspects of the present invention.

In accordance with an exemplary embodiment of the present invention, a network data processing system, such as network data processing system 100 illustrated in FIG. 1, provides a distributed messaging system that supports subscriptions. A subset of clients, for example, a subset of clients 110, 112 and 114 in FIG. 1, may be publishing clients, while others of the clients may be subscribing clients. Published events may also be generated by one or more servers, such as one or more of servers 104 and 106 in FIG. 1.

Figure 3:
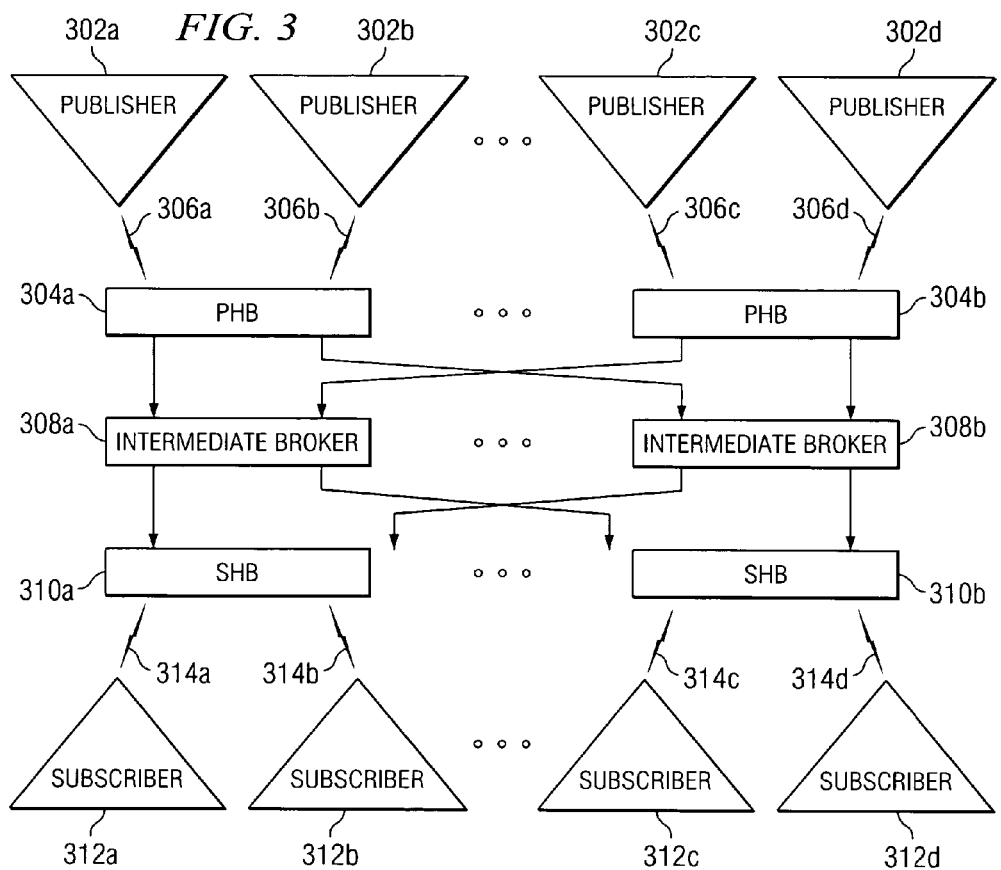
FIG. 3 is a diagram that schematically illustrates a broker network for a publish-subscribe messaging system according to an exemplary embodiment of the present invention.

FIG. 3 is a diagram that schematically illustrates a broker network for a publish-subscribe messaging system according to an exemplary embodiment of the present invention. The messaging system is implemented within an overlay network of service machines referred to as "brokers". One or more of servers 104 and 106 in FIG. 1, may, for example, be broker machines. A plurality of broker machines are responsible for delivery of messages sent by publishing clients towards subscribing clients based on the content of the messages and the subscriptions requested by the subscribing clients. Some broker machines may be specialized for hosting publishing clients, referred to as publisher hosting brokers (PHB), and others for hosting subscribing clients, referred to as subscriber hosting brokers (SHB). Between the PHBs and the SHBs, there may be any number of intermediate nodes that include routing and filtering. The brokers at the intermediate nodes are referred to as intermediate brokers or IBs. For expository purposes, this separation of brokers is assumed; however, in actual deployment, some or all of the broker machines may combine the functions of PHB, SHB and/or IB. A publishing client, such as one of publishers 302*a*-302*d* establish a connection to a PHB, such as PHB 304*a* or 304*b*, over a corresponding one of client connections 306*a*-306*d*. Independently, a subscribing client, such as one of subscribers 312*a*-312*d*, establishes a connection to a SHB, such as SHB 310*a* or SHB 310*b*, over a corresponding one of client connections 314*a*-314*d*. The PHBs and SHBs are connected, via intermediate brokers 308*a*-308*b*, through an array of broker-to-broker links.

In the exemplary broker network depicted in FIG. 3, one or more execution engines may run on the brokers in the network and be interconnected. The one or more execution engines may be interconnected to form a distributed execution engine. The execution engines running on the plurality of broker machines receive input messages; process the input messages using transform objects, and route output messages toward subscribers. The broker-to-client and broker-to-broker connections may be, for example, any reliable first in-first out (FIFO) connection, such as a Transmission Control Protocol/Internet Protocol (TCP/IP) socket connection.

The present invention provides a computer implemented method and system for analyzing message streams in order to determine which streams (and parts of streams) of a plurality of message streams can be delivered to a correct recipient among, possibly, a plurality of users in order to provide high quality information as specified by the users. According to an exemplary embodiment of the present invention, one or more message streams that contain one or more messages that satisfy a user's criteria are selected and evaluated, and this evaluation is used to deliver further messages to the user from the one or more message streams.

Figure 4:
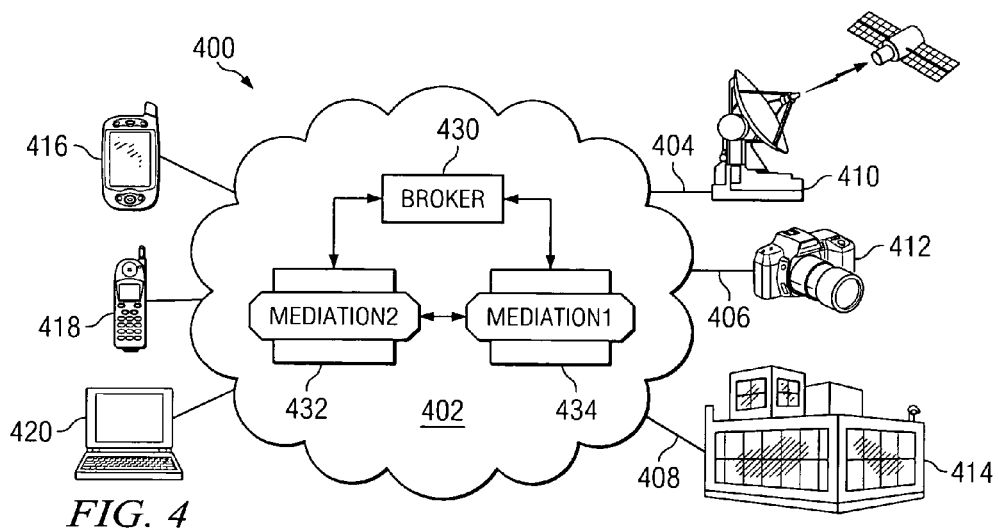
FIG. 4 is, a diagram that schematically illustrates a publish-subscribe messaging system according to an exemplary embodiment of the present invention.

FIG. 4 is a diagram that schematically illustrates a publish-subscribe messaging system according to an exemplary embodiment of the present invention. The system is generally designated by reference number 400, and includes broker network 402, which may, for example, be implemented as broker network 300 illustrated in FIG. 3. System 400 receives a plurality of streams of multimedia messages 404, 406 and 408 from a plurality of message stream sources 410, 412 and 414, respectively, analyzes the received message streams, and delivers one or more messages from one or more of the plurality of message streams to subscribers 416, 418 and 420 in accordance with criteria established by the subscribers specifying message content and message content quality.

In FIG. 4, message sources 410, 412 and 414 include a satellite feed, a ground camera and a roof-mounted sensor. It should be understood that these are intended to be exemplary only as the message sources can comprise any number of message sources of any suitable type. Also in FIG. 4, three subscribers 416, 418 and 420 including subscribers utilizing a PDA, a mobile phone and a laptop computer are shown. This is also intended to be exemplary only as the subscribers can include any number of subscribers utilizing any type of message receiving mechanism.

Broker 430 in broker network 402 analyzes comparable message samples from each of message streams 404, 406 and 408 to identify samples that meet the criteria specified by the subscribers. According to an exemplary embodiment of the present invention, all samples which meet the criteria are ranked, and a subset comprising the top k streams are chosen for delivery for the duration of a sample period. In a simple exemplary embodiment, for example, k=1, and exactly one sample is taken per stream per period. At the next sample period, the process is repeated. The determination of what constitutes a comparable message may depend on various factors including the time a message is received, the time a message is sensed, message location, spatial coverage of a message, a time code associated with a message (e.g., SMPTE time codes), and the like.

A subscriber's criteria can include any criteria desired by the subscriber relating to message content and message content quality. For example, in the battlefield environment described previously, criteria may include that a scene be brightly lit, well-focused or least noisy. The evaluation of whether a sample meets the subscriber's criteria is achieved by using multimedia analysis involving either image or audio analysis. For example, if a criterion is "brightly lit", then an image analysis algorithm can be used that can compute the brightness distribution within an image and measure the contrast to determine a level of brightness. Other useful criteria include (1) the image showing the best contrast, (2) the image showing the greatest detail, and (3) the image showing the fullest view. Such image analysis algorithms are part of image analysis libraries that are readily available both commercially and to the general public. These can be implemented as mediators in the stateful publish-subscribe system as schematically illustrated at 432 and 434 in FIG. 4.

Received messages can be switched back and forth from one source to another depending on the degree of satisfaction of the criteria. For example, a camera focused on a military objective may provide images for a first time slot; however, if the camera becomes obscured, a satellite image feed may be used to provide images for a second time slot. Once the first camera is clear of the obstruction, it may once again provide images for a third time slot.

According to a further exemplary embodiment of the present invention, multiple comparable message streams are delivered. When a sample image from a message stream is identified that most satisfies a subscriber's criteria, other messages in the local neighborhood of the same stream (i.e., from frames close in time to the sample image such as immediately before and immediately after the sample image) are examined. If these messages also meet the criteria, the sample and the neighborhood messages are delivered to the subscriber.

The size of the neighborhood may be constrained via system parameters or user specifications, or may be adaptive. Note that even when k=1, samples and their neighborhood messages from multiple sources that overlap in time can be promptly provided. This exemplary embodiment also enables scenarios where as much information as possible about a single event, from multiple sources is desirable. For example, if the event is an explosion, this exemplary embodiment can provide not only one or more close-up views of the explosion, but also a wide angle view from satellite imagery.

Figure 5:
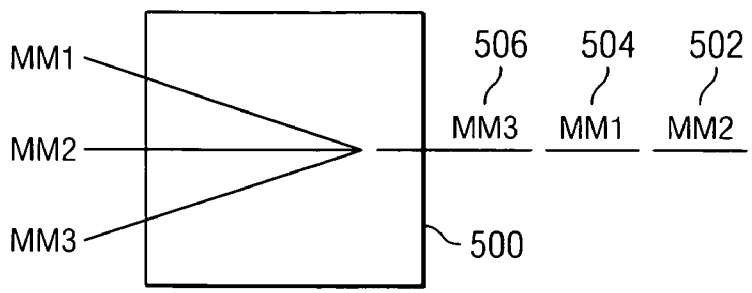
FIG. 5 is a diagram that schematically illustrates selection of message streams among multiple message streams according to an exemplary embodiment of the present invention.

FIG. 5 is a diagram that schematically illustrates selection of message streams among multiple message streams according to an exemplary embodiment of the present invention. As shown, a plurality of published message streams MM1, MM2 and MM3 are received by a broker 500. Broker 500 samples and analyzes the message streams, for example, using mediation as illustrated in FIG. 4, to determine if they meet criteria specified by a subscriber. The top samples from a substream that best meet the criteria are then sent to the subscriber. As shown in FIG. 5, samples from message stream MM2 are sent to the subscriber during a first time interval 502 as best meeting the criteria, while samples from message streams MM1 and MM3 are sent during subsequent time intervals 504 and 506, respectively, as best meeting the criteria during those time intervals.

Figure 6:
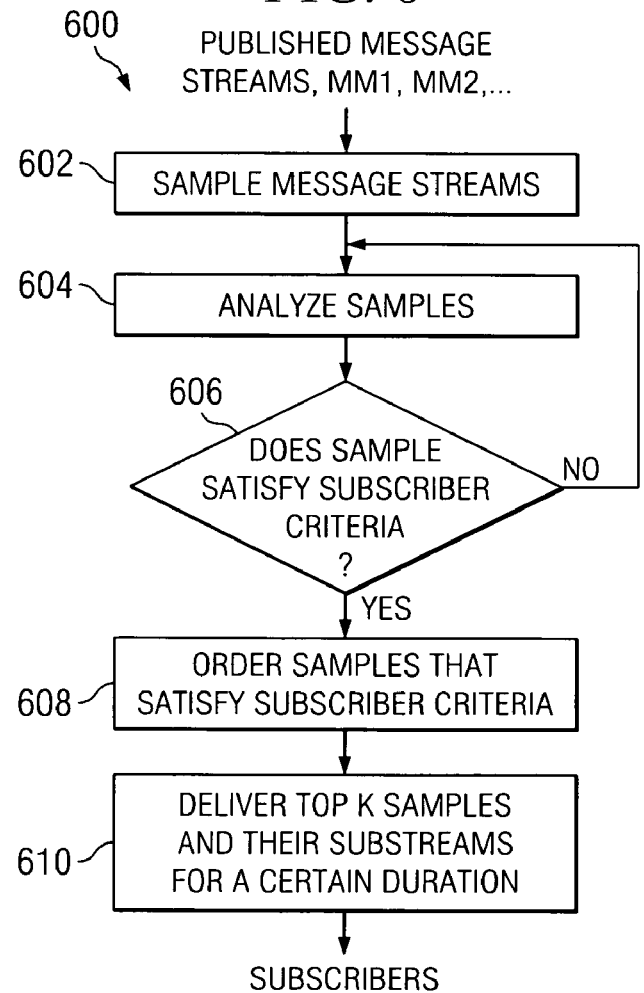
FIG. 6 is a flowchart that illustrates a method for delivering published messages to a plurality of subscribers according to an exemplary embodiment of the present invention.

FIG. 6 is a flowchart that illustrates a method for delivering published messages to a plurality of subscribers according to an exemplary embodiment of the present invention. The method is generally designated by reference number 600, and begins by sampling a plurality of published message streams MM1, MM2, etc. (Step 602). The samples are then analyzed (Step 604), and a determination is made whether the samples satisfy criteria established by subscribers specifying message content and message content quality (Step 606). If a sample does not satisfy the criteria (No output of Step 606), the method returns to Step 604 to continue analyzing samples.

If samples do satisfy the criteria (Yes output of Step 606), the samples are ordered (Step 608). The top k samples and, optionally, their substreams (for example, the samples together with messages before and after the samples) are then delivered to the appropriate subscribers for a specified time duration (Step 610). The process is then repeated for subsequent time durations.

The present invention thus provides a computer implemented method, system and computer program product for delivering published messages to at least one subscriber in a publish-subscribe messaging system. A computer implemented method for delivering published messages to a subscriber includes receiving a plurality of message streams, and analyzing at least one message from each of the plurality of message streams in accordance with criteria established by the subscriber specifying a message content and a message content quality. At least one message that satisfies the criteria is delivered to the subscriber.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for delivering published messages to a subscriber, the method comprising:
    sampling a plurality of published message streams from a multimedia source, the multimedia source being selected from one of a satellite image feed, a ground camera, and a roof-mounted sensor;
    analyzing message samples that are determined to be comparable, from the sampled plurality of published message streams from the multimedia source,
        the analyzing being based on a criteria established by the subscriber, the criteria specifying a multimedia message content and a multimedia message quality,
        wherein the specified message quality comprises at least one of a brightness, focus, noisiness, image clarity, image resolution, sound clarity, and measurement precision,
        wherein the analyzing includes performing a multimedia analysis consisting of one of an image and an audio analysis, and
        wherein determining that a message sample is comparable is based on factors including at least one of a time a message sample is received, a time a message sample is sensed, a location of the message sample, and a time code associated with a message sample;
    determining, based on the analyzing, whether the message samples satisfying the criteria;
    responsive to the comparable message samples not satisfying the criteria, repeating the analyzing and determining;
    ranking the comparable message samples;
    selecting a number, k, of top ranked comparable message samples that satisfy the criteria, where k is greater than zero;
    ordering the selected number of top ranked comparable message samples;
    delivering, to the subscriber the selected number of top ranked comparable message samples; and delivering with the k top ranked comparable message samples, substreams of the k top ranked comparable message samples,
        wherein the substream comprises the selected message sample together with messages from before and after the selected message sample from the sampled message stream;
    repeating the determining, selecting, ordering, and delivering steps for each of a plurality of consecutive predetermined time periods.

* * * * *